(12) United States Patent
Zhang et al.

(10) Patent No.: US 7,010,304 B1
(45) Date of Patent: Mar. 7, 2006

(54) CELL PLANNING METHODS AND APPARATUS, AND NETWORKS CONFIGURED BASED ON SAME

(75) Inventors: Ming Zhang, Redmond, WA (US); Alan Denis MacDonald, Bellevue, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 345 days.

(21) Appl. No.: 10/253,403

(22) Filed: Sep. 23, 2002

(51) Int. Cl.
*H04Q 7/20* (2006.01)

(52) U.S. Cl. .................... 455/446; 455/447; 455/448; 455/449; 455/450; 455/562.1; 343/875; 342/367; 342/423; 342/445

(58) Field of Classification Search ............... 455/429, 455/446, 447, 448, 449, 451, 562.1; 343/875; 342/367, 379, 423, 445
See application file for complete search history.

(56) References Cited

U.S. PATENT DOCUMENTS

| | | | | |
|---|---|---|---|---|
| 5,073,971 | A | * | 12/1991 | Schaeffer .................... 455/447 |
| 5,537,682 | A | | 7/1996 | Miller |
| 5,649,292 | A | * | 7/1997 | Doner ........................ 455/447 |
| 5,734,983 | A | * | 3/1998 | Faruque ...................... 455/450 |
| 5,802,474 | A | * | 9/1998 | Faruque ...................... 455/447 |
| 5,890,066 | A | | 3/1999 | Levin |
| 5,901,356 | A | * | 5/1999 | Hudson ...................... 455/451 |
| 6,035,219 | A | * | 3/2000 | Brodie ..................... 455/562.1 |
| 6,061,567 | A | * | 5/2000 | Mao et al. .................. 455/447 |
| 6,188,894 | B1 | | 2/2001 | Clancy |
| 6,311,068 | B1 | | 10/2001 | Leung et al. |
| 6,339,708 | B1 | * | 1/2002 | Wang ........................ 455/447 |
| 6,393,302 | B1 | * | 5/2002 | O'Byrne ................. 455/562.1 |
| 6,405,044 | B1 | * | 6/2002 | Smith et al. ................ 455/447 |
| 6,415,162 | B1 | * | 7/2002 | Dent ....................... 455/562.1 |
| 6,560,459 | B1 | * | 5/2003 | Wong ........................ 455/447 |
| 2002/0019233 | A1 | | 2/2002 | Leung et al. | |

OTHER PUBLICATIONS

U.S. Appl. No. 10/114,786, filed Apr. 3, 2002, Nguyen et al.
U.S. Appl. No. 10/160,481, filed May 31, 2002, Nguyen et al.
Xiang, J., *A Novel Two Site Frequency Reuse Plan*, IEEE Vehicular Technology Conference, pp. 441-445 (1996).
Fong, T., et al., *Radio Resource Allocation in Fixed Broadband Wireless Networks*, IEEE Trans. on Comm. 46:806-818 (Jun. 1998).
Wang, L., et al., *Architecture Design, Frequency Planning, and Performance Analysis for a Microcell/Macrocell Overlaying System*, IEEE Trans. Veh. Tech. 46:836-848 (Nov. 1997).
Wang, L., *A New Cellular Architecture Based on an Interleaved Cluster Concept*, IEEE Trans. Veh. Tech., 48: 1809-1818 (Nov. 1999).
Nguyen, V., et al., *Channel Alternation and Rotation in Narrow Beam Trisector Cellular Systems*, IEEE Veh. Tech. Conf., pp. 394-398 (Oct. 2001).

* cited by examiner

*Primary Examiner*—Stephen D'Agosta
(74) *Attorney, Agent, or Firm*—Klarquist Sparkman, LLP

(57) ABSTRACT

Coverage areas for wireless networks are divided into a plurality of cells that are arranged in rows. Channel frequencies are assigned to cell sectors and associated with respective antenna axes. The antenna axes of adjacent rows are alternatingly rotated, thereby reducing co-channel interference. In an example, an available bandwidth is divided into twelve channel frequencies, so that a cell cluster includes four cells. Co-channel cells associated with half the channel frequencies are assigned to cells in the first row of cells, and the remainder are assigned to cells in the second row.

6 Claims, 6 Drawing Sheets

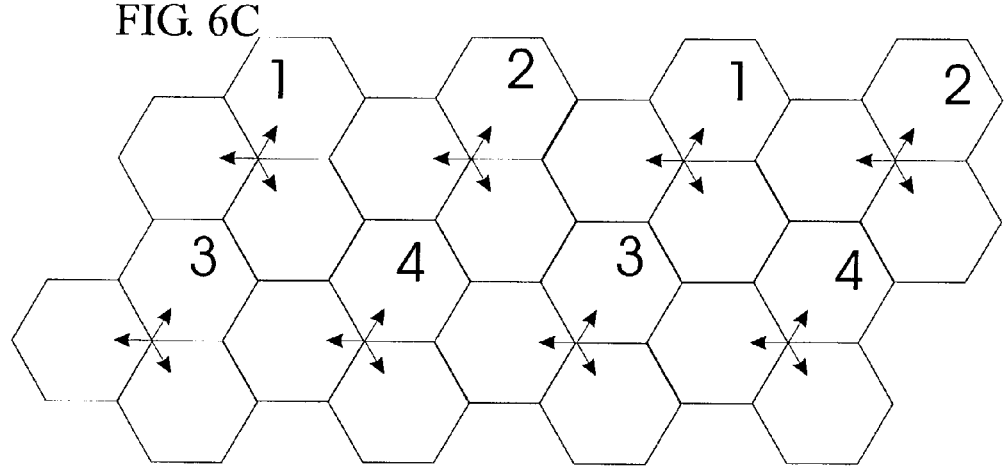

CELL PLANNING METHODS AND APPARATUS, AND NETWORKS CONFIGURED BASED ON SAME

FIELD

The disclosure pertains to cell arrangement in wireless communication networks.

BACKGROUND

Wireless communication systems typically provide services to a subscriber coverage area based on a division of the coverage area into areas referred to as cells. Typically the cells are further divided into sectors, and portions of the available radio bandwidth are assigned to each of the sectors. A group of cells that uses all available channel frequencies is generally referred to a cluster, and the number of cells per cluster (N) is a measure of frequency reuse. Because the number of available frequencies is limited, efficient frequency reuse is an important consideration in wireless network layout. Cell layout is generally selected based on providing acceptable communication throughout the coverage area while avoiding interference between signals associated with the same frequency but produced in different cells. Each cell is typically associated with a cell site at which antennas for the cell sectors are located.

FIG. 1 illustrates a so-called wide-beam trisector division of a cellular coverage area 100. The coverage area 100 is divided into a plurality of hexagonal cells and an available radio bandwidth is divided into 12 different channel frequencies $f_1, \ldots, f_{12}$. Three channel frequencies are assigned to each of the cells. As shown in FIG. 1, cells 102, 104, 106, 108 use frequencies $f_1$–$f_3$, $f_4$–$f_6$, $f_7$–$f_9$, and $f_{10}$–$f_{12}$, respectively, and form a first cluster 111. Thus, for the arrangement of FIG. 1, N=4. Additional cell clusters 112, 113, 114 are provided to extend the cellular coverage area. As shown in FIG. 1, the cells are associated with three channel frequencies and three corresponding 120 degree antennas. The antennas are configured to communicate with corresponding sectors of the hexagonal cell areas using different channel frequencies. For example, antennas situated in the cell 102 are arranged to have transmission/reception directions 116, 117, 118 configured to service sectors 126, 127, 128, respectively. While this arrangement reduces co-channel interference, the coverage area 100 includes so-called dead spots such as the representative dead spots 120, 122, 124. These dead spots correspond to off-axis portions of antenna radiation patterns and are associated with reduced radio signal strength in comparison with other portions of the cellular coverage area 100.

FIG. 2 illustrates a cellular coverage area 200 divided according to a so-called narrow-beam trisector configuration in which each cell includes three 60 degree directional antennas that are assigned different channel frequencies and configured to serve corresponding hexagonal coverage areas. For example, the coverage area 200 includes a representative cluster 201 that includes so-called "cloverleaf" cells 202, 204, 206, 208. The cell 202 includes sectors 210, 212, 214 that are serviced by channel frequencies communicated along axes 216, 218, 220, respectively, typically using antennas having 60 degree beamwidths. The cluster 201 includes N=4 cells and each of the cells 202, 204, 206, 208 is assigned three channel frequencies so that this configuration is associated with 4 by 12 frequency reuse.

The coverage area 200 as divided according to FIG. 2 does not exhibit the dead spots associated with the wide-beam configuration of FIG. 1, but exhibits different limitations. Referring to cells 230, 232, a selected channel frequency is communicated along antenna axes 231, 233 in sectors 236, 238, respectively. Thus, a signal radiated along the antenna axis 233 in the cell 232 is also received in the cell 230 along the antenna axis 231. Thus, reuse of the channel frequency associated with the antenna axis 233 in the cell 232 results in so-called co-channel interference in the cell 230. This co-channel interference is caused by reception of a signal intended for a recipient in the sector 238 but received in the sector 236.

As shown in FIGS. 1–2, the arrangement of cells in a wireless communication network is generally based on reuse of channel frequencies to increase network capacity and improve network performance. Unfortunately, cellular arrangements such as those of FIGS. 1–2 exhibit unacceptable dead zones or unacceptable levels of co-channel interference. Thus, increasing frequency reuse to extend network capacity produces degraded received signal quality, and existing networks often exhibit dead zones or noticeable levels of co-channel interference. Because only limited bandwidth is available for most wireless systems, co-channel interference is a significant limitation on system data rate and number of subscribers served. Thus, systems and methods that reduce co-channel interference without introducing dead zones are needed.

SUMMARY

Methods of arranging a wireless network coverage area comprise dividing an available bandwidth into channel frequencies and allocating the channel frequencies to at least two cell cluster types. At least one of the cell cluster types is provided with rotated antenna axes and the channel frequencies are associated with antenna axis directions in the cell cluster types so that each channel frequency is associated with a single antenna axis. Cells are arranged in the wireless coverage area based on the at least two cell cluster types. In representative examples, the channel frequencies and antenna axes are assigned to the portions of the wireless network coverage area based on rows of cell clusters. In specific examples, the antenna axes assigned to a first row of cells are rotated with respect to antenna axes in a second row of cells. According to other representative examples, two types of cell clusters are provided and the types of cell clusters are assigned three antenna directions. In additional examples, the first set of antenna axes is rotated by about 60 degrees with respect to the second set of antenna axes. In other examples, 120 degree directional antennas or 60 degree directional antennas are associated with the antenna axes.

Methods of assigning channel frequencies in wireless coverage area comprise assigning a first set of channel frequencies to respective antenna axes of a first cell. A second set of channel frequencies is assigned to respective antenna axes of a second cell, wherein the antenna axes of the first cell are rotated with respect to the antenna axes of the second cell. The first cell and the second cell are included in a first row of cells and a second row of cells, respectively.

Methods of frequency reuse comprise dividing a communication bandwidth into channel frequencies. A first set of channel frequencies is assigned to a first row of cells, and a second set of channel frequencies is assigned to a second row of cells. The second row of cells is configured to transmit the second set of channel frequencies at angles of about 60 degrees with respect to directions in which the first set of channel frequencies is transmitted in the first row of cells. According to representative examples, the communication bandwidth is divided into twelve channel frequencies $f_1$–$f_{12}$. In specific examples, the channel frequencies $f_1$, $f_2$, $f_3$ and $f_4$, $f_5$, $f_6$ are assigned to a first cell and a second cell, respectively, of the first row of cells and channel frequencies $f_7$, $f_8$, $f_9$ and $f_{10}$, $f_9$, $f_{12}$ are assigned to a first cell and a second cell, respectively, of the second row of cells so that each channel frequency is associated with a selected antenna axis direction.

Wireless networks comprise a first cell site configured to transmit along three or more antenna axes and a second cell site configured to transmit along three or more antenna axes. The antenna axes of the first cell site are rotated with respect to the antenna axes of the second cell site. In additional examples, the first cell site and the second cell site are configured to transmit along three axes, and the axes of the first cell site are rotated by about 60 degrees with respect to the axes of the second cell site.

Wireless communication systems comprise a plurality of cells of a first cell type situated in a coverage area, wherein the cells of the first type are associated with a first set of antenna axes that are assigned channel frequencies from a first set of channel frequencies. A plurality of cells of a second cell type are situated in the coverage area, wherein cells of the second type are associated with a second set of antenna axes that are assigned channel frequencies from a second set of channel frequencies. The channel frequencies of the first set differ from the channel frequencies of the second set and the second set of antenna axes is rotated with respect to the first set of antenna axes. In some examples, the first set of antenna axes includes three axes angularly spaced by about 120 degrees, and the second set of antenna axes includes three axes angularly spaced by about 120 degrees. According to other representative examples, wireless communication system further comprise a plurality of cells of a third cell type situated in the coverage area, wherein cells of the third type are associated with the first set of antenna axes and are assigned channel frequencies from a third set of channel frequencies and a plurality of cells of a fourth cell type situated in the coverage area, wherein cells of the fourth cell type are associated with the second set of antenna axes, and are assigned channel frequencies from a fourth set of channel frequencies, wherein the channel frequencies of the first, second, third, and fourth sets are all different. In additional representative examples, a cell cluster consists of one cell of each of the first, third, and fourth cell types.

Methods of arranging a wireless communication system comprise situating a plurality of cells of a first cell type in a coverage area and associating the cells of the first type with a first set of antenna axes. A first set of channel frequencies is assigned to the cells of the first cell type. A plurality of cells of a second cell type is situated in the coverage area and the cells of the second type are associated with a second set of antenna axes that are rotated with respect to the antenna axes of the first set of antenna axes. A second set of channel frequencies, different from the channel frequencies of the first set, is assigned to the cells of the second cell type. In other examples, the first set of antenna axes and the second set of antenna axes include three antenna axes angularly spaced by 120 degrees, and each of the antenna axes is assigned a respective frequency channel. In other examples, methods of arranging a wireless communication system comprise situating a plurality of cells of a third cell type in the coverage area, wherein cells of the third type are associated with the first set of antenna axes. A third set of channel frequencies is assigned to the third cell type. A plurality of cells of a fourth cell type are situated in the coverage area and are assigned a fourth set of channel frequencies, wherein the channel frequencies of the first, second, third, and fourth cell types are all different. In other examples, cells of the first cell type and the third cell type are alternately arranged to form at least a first row and cells of the second cell type and the fourth cell type are alternately arranged to form at least a second row.

Methods of reducing co-channel interference in a wireless communication network comprise selecting at least one cell and rotating antenna axes of the at least one cell. In some examples, the antenna axes of the at least one cell are rotated by about 60 degrees.

Methods of arranging a wireless network coverage area comprise dividing the wireless coverage area into at least a first row and a second row of cells. An available frequency bandwidth is divided into twelve channel frequencies and first set of antenna axes is assigned to the first row of cells. A second set of antenna axes is assigned to the second row of cells, wherein the first set of antenna axes is rotated with respect to the second set of antenna axes. A first set of channel frequencies is assigned to the first row of cells and a second set of channel frequencies is assigned to the second row of cells. In representative examples, channel frequencies of the first and second set are different, and each channel frequency is associated with a different antenna axis direction.

Methods of arranging cells in a wireless network service area comprise dividing the network service area into a plurality of hexagonal cells and defining sectors in the cells. A set of antenna axes is assigned to the plurality of cells and channel frequencies are assigned to the plurality of cells. The antenna axes are rotated, and hexagonal cell sectors are associated with the rotated antenna axes. In a representative example, the antenna axes are rotated by about 30 degrees.

These and other features of the disclosure are set forth below with reference to the accompanying drawings.

BRIEF DESCRIPTION OF THE DRAWINGS

FIGS. 6B–6C illustrate frequency assignments for cloverleaf cells.

DETAILED DESCRIPTION

Figure 3:
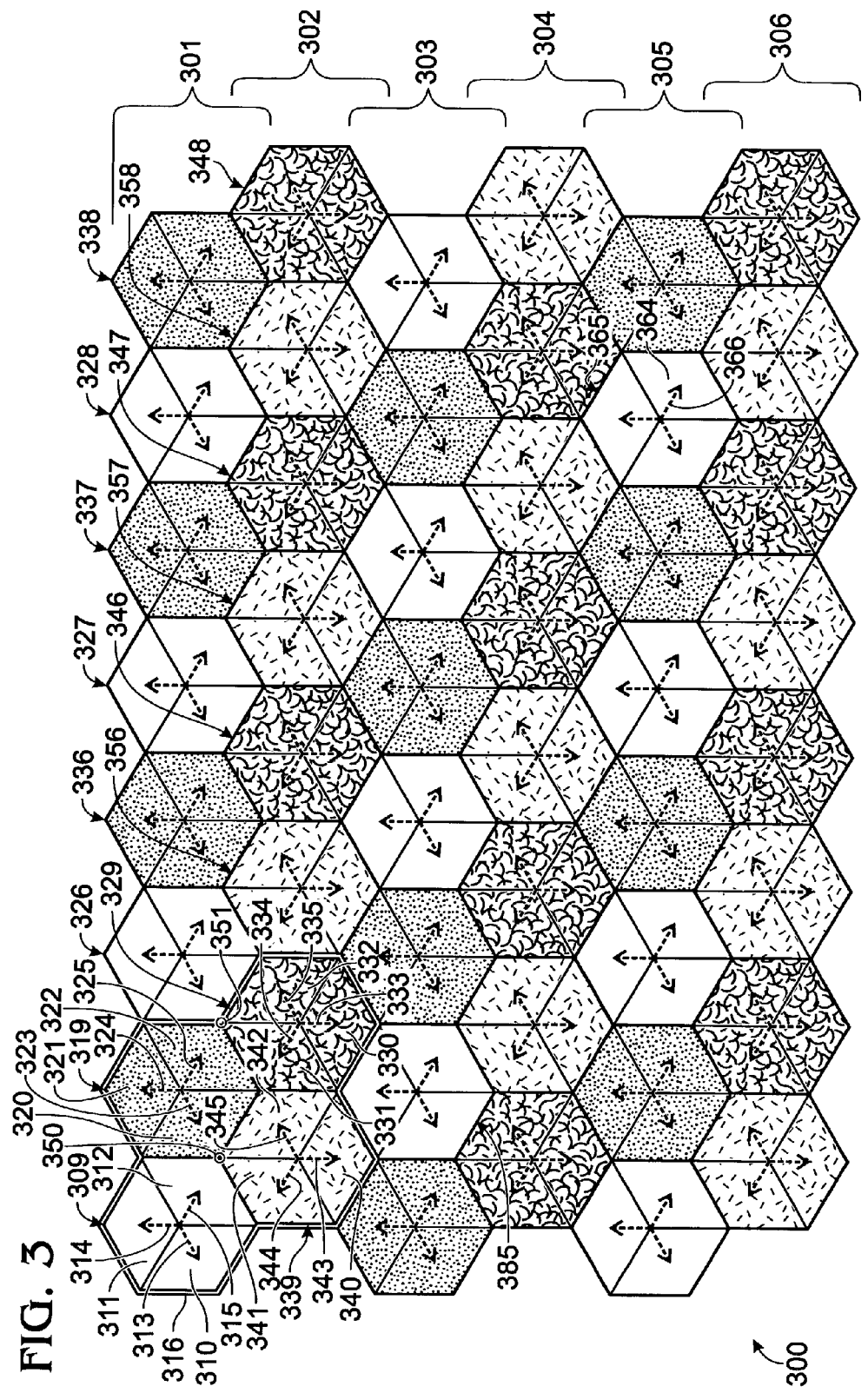
FIG. 3 illustrates division of a cellular coverage area into cells based on a rotated antenna configuration for a frequency reuse factor N=4.

With reference to FIG. 3, a wireless network coverage area 300 is divided into a plurality of cells arranged in cell rows 301–306. An available bandwidth is divided into twelve channel frequencies $f_1 \ldots, f_{12}$ that are assigned to the cells as described below. The cells 309, 319, 329, 339 are divided into sectors 310–312, 320–322, 330–332, 340–342, respectively. The sectors 310–312 are assigned the channel frequencies $f_1$, $f_2$, $f_3$, respectively, the sectors 320–322 are assigned the channel frequencies $f_4$, $f_5$, $f_6$, respectively, the sectors 330–332 are assigned the channel frequencies $f_7$, $f_8$, $f_9$, respectively, and the sectors 340–342 are assigned the channel frequencies $f_{10}$, $f_{11}$, $f_{12}$, respectively. Thus, the representative cells 309, 319, 329, 339 form a representative cluster 316. Because the cluster 316 includes N=4 cells, and each cell of the cluster 316 is assigned three distinct channel frequencies so the configuration of FIG. 3 corresponds to 4 by 12 frequency reuse.

Other cells shown in FIG. 3 are similarly divided into sectors and assigned the channel frequencies $f_1, \ldots, f_{12}$ to form additional clusters. For example, cells 326–328 are assigned the channel frequencies $f_1$, $f_2$, $f_3$, cells 336–338 are assigned the channel frequencies $f_4$, $f_5$, $f_6$, cells 346–348 are assigned the channel frequencies $f_7$, $f_8$, $f_9$, and cells 356–358 are assigned the channel frequencies $f_{10}$, $f_{11}$, $f_{12}$. Cells that are assigned the same set of channel frequencies are referred to as "co-channel" cells. Thus, the cells 309, 326–328 are co-channel cells, the cells 319, 336–338 are co-channel cells, the cells 329, 346–348 are co-channel cells, and the cells 339, 356–358 are co-channel cells. For convenience, co-channels cells are indicated in FIG. 3 using a common shading for each set of co-channel frequencies.

Antennas corresponding to the selected channel frequencies $f_1$, $f_2$, $f_3$ are situated in the cell 309 and are configured to communicate with the sectors 310–312 along antenna axes 313–315, respectively. Antennas are similarly configured in the sectors 320–322, 330–332, 340–342 to communicate along respective antenna axes 323–325, 333–335, 343–345. Other co-channel cells have similar divisions into sectors and associated antenna axes. Antennas associated with the cells can be configured to have 60 degree, 90 degree, 120 degree or other beam widths. The antenna axes 313–315 of the cell 309 are rotated by about 60 degrees with respect to the antenna axes 343–345 of the cell 339. As shown in FIG. 3, antenna axes of the cells of the rows 301, 303, 305 are similarly rotated by about 60 degrees with respect to the antenna axes in the cells of the rows 302, 304, 306.

Figure 1:
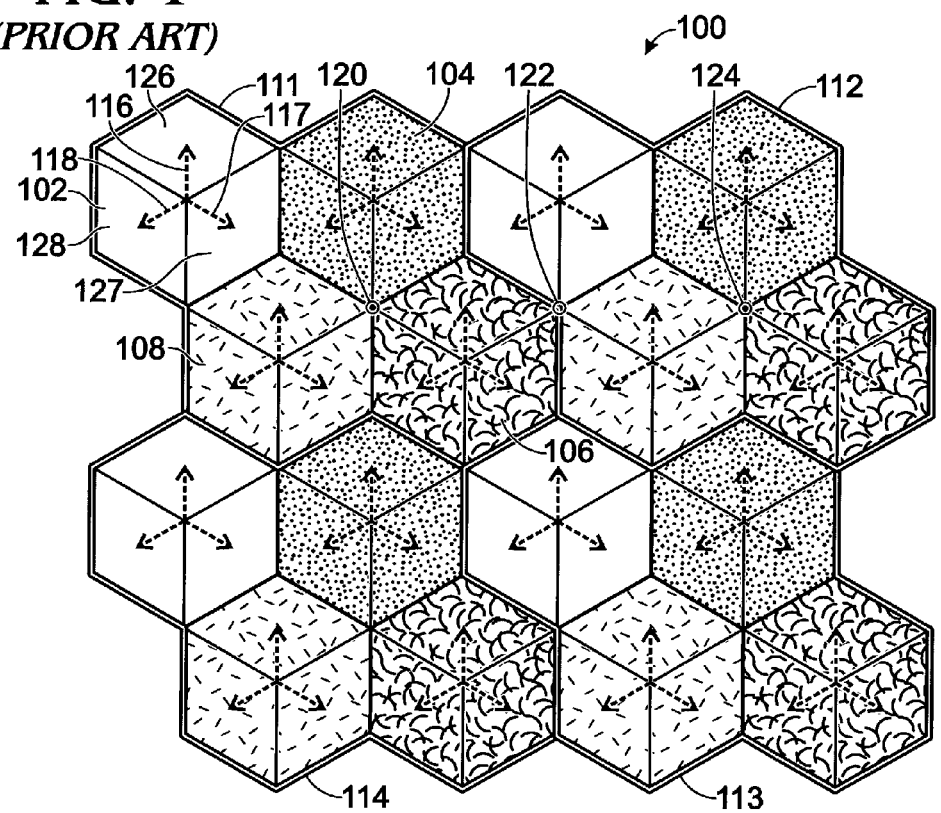
FIG. 1 illustrates a division of a cellular network area based on a wide-beam trisector configuration.
Figure 2:
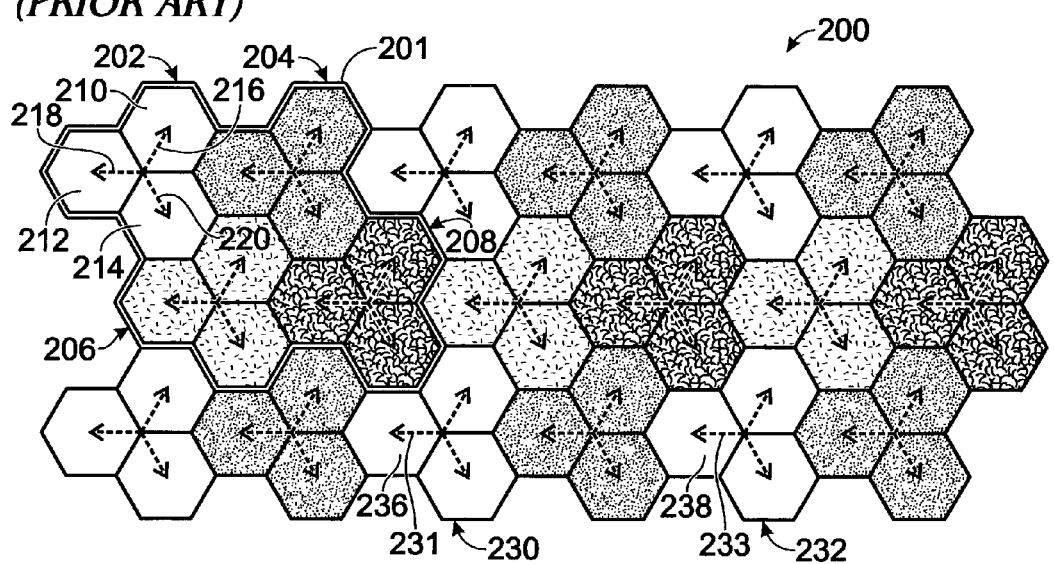
FIG. 2 illustrates division of a cellular coverage area based on a narrow-beam trisector configuration.

The arrangement of antennas in the coverage area 300 shown in FIG. 3 is associated with reduced co-channel interference and reduced dead zones. Cell boundary regions 350, 351 can correspond to dead zones in a conventional wide angle trisector configuration such as shown in FIG. 1, but in the configuration of FIG. 3, the cell boundary regions 350, 351 are situated directly along the antenna axes 315, 325, respectively. Antenna beamwidth selection is not limited by potential dead spots. Co-channel interference is also reduced. For example, the cell 309 transmits the channel frequency assigned to a sector 364 of a cell 365 along the antenna axis 315 that is collinear with an antenna axis 366 associated with the same channel frequency in the cell 365. However, the cell 365 is distant from the cell 309 so that signals transmitted in the cell 309 are likely to be greatly attenuated and appear only at signal levels that do not produce objectionable co-channel interference. Co-channel cells that are closer to the cell 309 than the cell 365 have non-collinear antenna axes that tend to reduce co-channel interference. For example, with respect to the cell 309, a co-channel cell 385 that is adjacent the cluster 316 has different antenna axes so that co-channel interference between the cells 309, 385 is reduced even though they are not widely separated.

Figure 4:
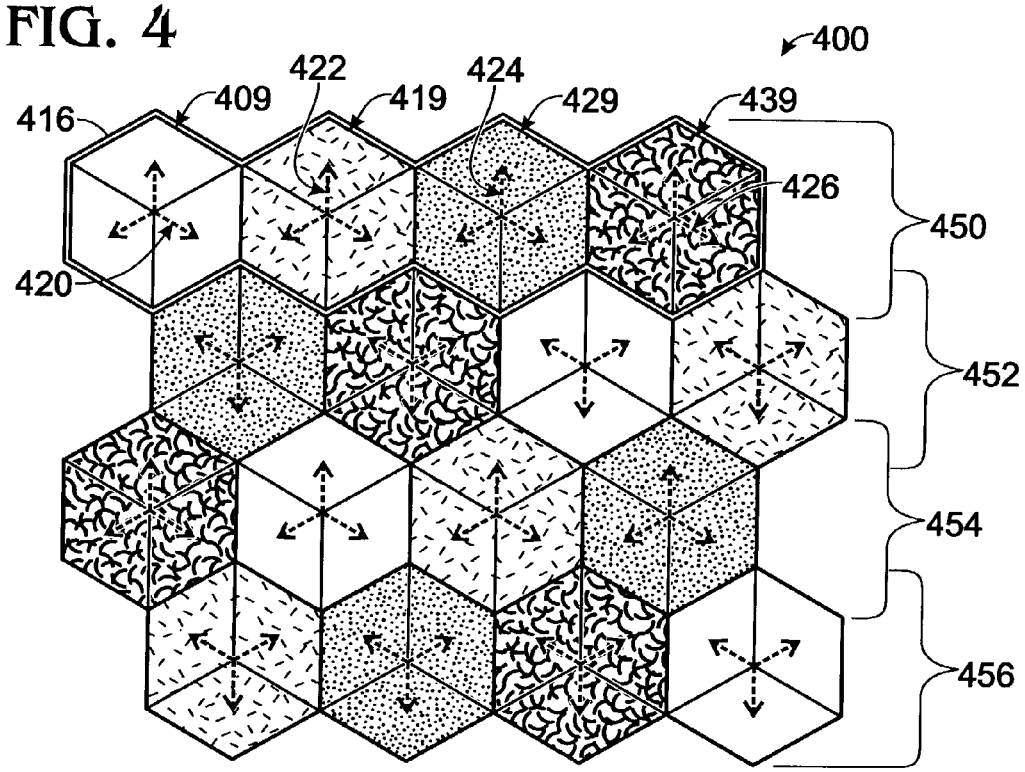
FIG. 4 illustrates an alternate division of a cellular coverage area into cells based on a rotated antenna configuration for a frequency reuse factor N=4.

With reference to FIG. 4, a coverage area 400 is divided into cells such as representative cells 409, 419, 429, 439 that have associated sets 420, 422, 424, 426 of antenna axes, respectively. An available frequency bandwidth is divided into twelve channel frequencies, and three different channel frequencies are assigned to each of the cells 409, 419, 429, 439 to form a representative cluster 416. The coverage area is divided into cell rows 450, 452, 454, 456 that include cells similar to the representative cells 409, 419, 429, 439. For convenience, cells associated with the same set of channel frequencies are similarly shaded in FIG. 4. The cell rows 450, 452, 454, 456 are configured to have antenna axes that are alternatingly rotated. The configuration of FIG. 4 used twelve channel frequencies and has a cluster size of N=4 cells and represents 4 by 12 frequency reuse.

In the examples of FIGS. 3–4, coverage areas are divided based on an arrangement of hexagonal cells having distinct boundaries. In operating wireless networks, effective boundaries between cells and effective cell areas generally depend on radio signal power obtained by a mobile station from various antennas, and thus can depend on local propagation characteristics. For example, a particular transmitter is selected to communicate with a mobile station based on power received by the mobile station. If the received power from a selected antenna is less than a received antenna from a second antenna, the second antenna can be selected for communication, thereby indicating an effective cell or segment boundary. The methods and apparatus described herein are applicable to such effective cell areas. For convenience, cells are illustrated as hexagonal, but cells in a wireless network can have other shapes.

Figure 5:
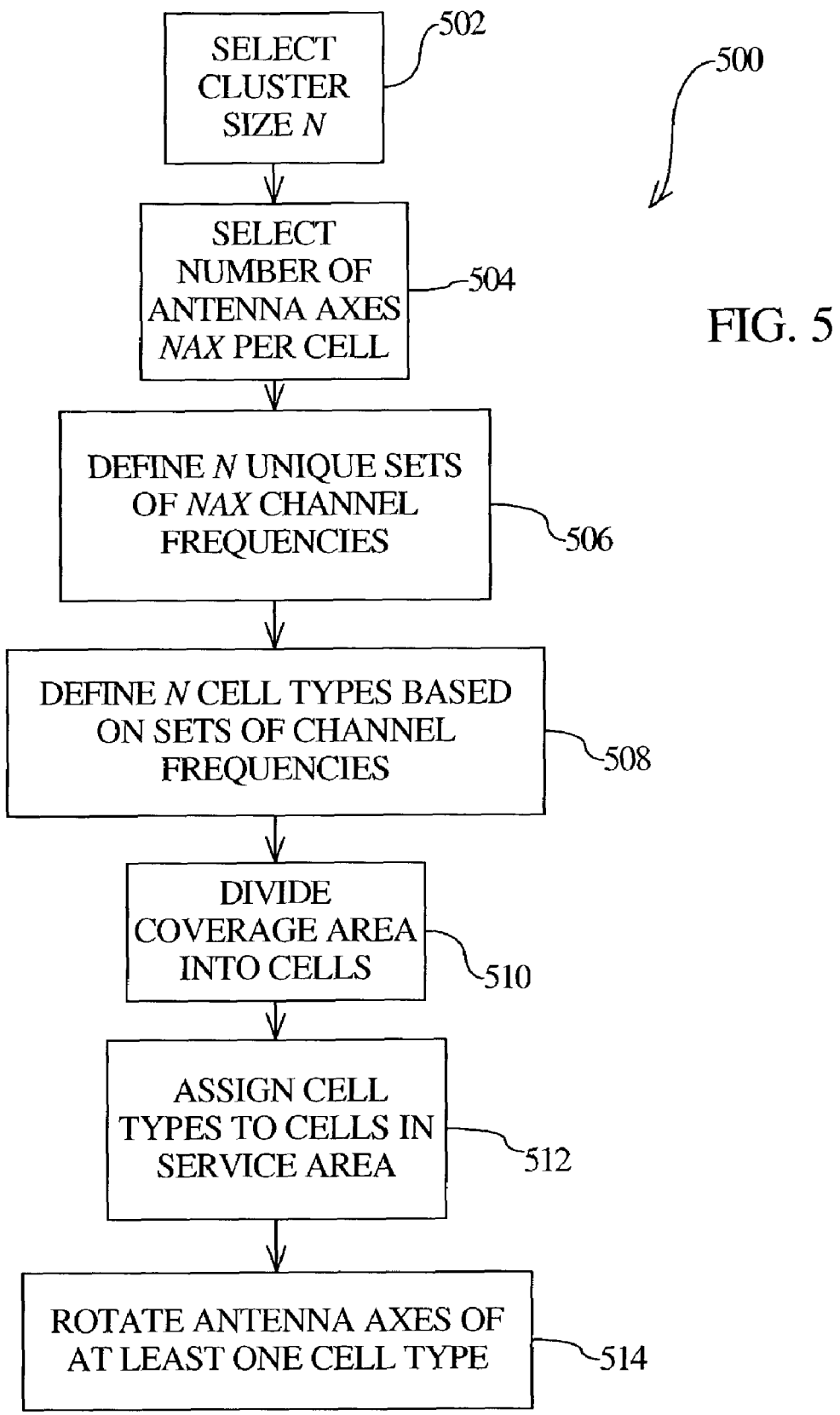
FIG. 5 is a block diagram illustrating a method for arranging cells in a wireless network service area.

Referring to FIG. 5, a method 500 of configuring a coverage area in a wireless network includes selecting a cluster size N in a step 502 and a number NAX of antenna axes per cell in a step 504. In a step 506, N sets of NAX channel frequencies are selected, and, based on these N sets, N cell templates are defined by assigning sets of channel frequencies and associating channel frequencies with antenna axes in a step 508. Each of the cell templates is associated with a different set of channel frequencies and each channel frequency is assigned to only one cell template. A coverage area is divided into cells in a step 510, and in a step 512, the cells are assigned channel frequencies and antenna axes based on the cell templates. Antenna axes of at least one selected type are rotated in a step 514.

In a representative example of the method 500, a cluster size of N=4 and NAX=3 antenna axes spaced every 120 degrees are selected. These sets are used to create cell templates that are used to define cells in a coverage area. The cells of the coverage area assigned channel frequencies and antenna axes based on the cell templates. As originally arranged in the coverage area, each of the antenna axes is parallel to an antenna axis of each of the other cells. The antenna axes of cells associated with at least one cell template are then rotated by 60 degrees. In the example of FIG. 3, the antenna axes associated with the cells of a selected row are rotated, and in other examples, antenna axes of cells of a selected column, or of alternate cells, or selected cells are rotated.

The method 500 of FIG. 5 can be implemented using a personal computer, workstation, or other computer based on a series of instructions provided in a computer readable medium such as a floppy disk, hard disk, or other disk, or provided via a network or otherwise provided. For convenience, a display can be configured to exhibit a cell arrangement in a wireless network coverage area, and antenna axis rotations can be selected using the exhibited cell arrangement. In some examples, radio parameters such as radio signal loss or co-channel signal levels can be displayed as well so that cells can be selected for antenna axis rotation based on network communication properties.

Figure 6A:
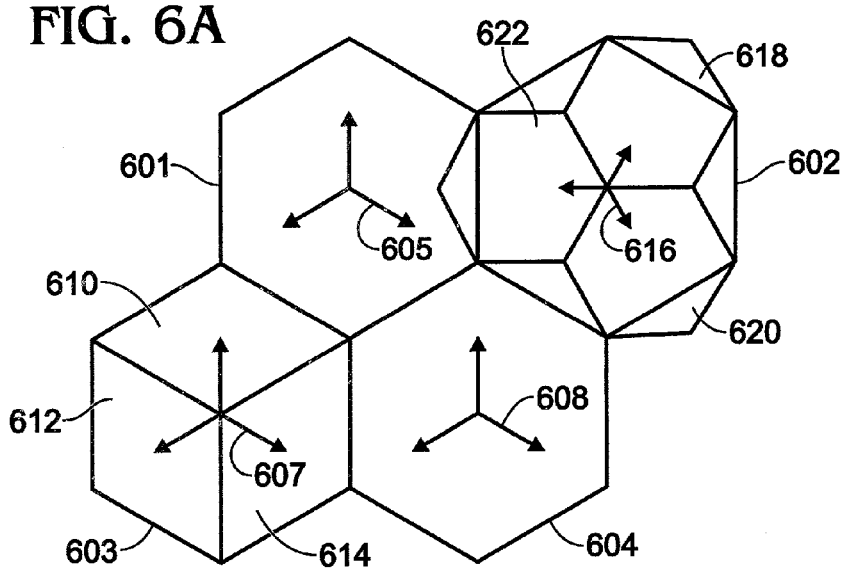
FIG. 6A illustrates mapping hexagonal cells into cloverleaf cells using an antenna axis rotation.

Cell layouts based on hexagonal cells that are divided into sectors can be reconfigured by rotating antenna axes. With reference to FIG. 6A, a network layout includes hexagonal cells 601, 602, 603, 604. The cells 601, 603, 604 have associated antenna axes 605, 607, 608, respectively, that are arranged to communicate with cell sectors. For example, the antenna axes 607 of the cell 603 are situated to communicate with sectors 610, 612, 614. Frequency assignments to the antenna axes are not shown in FIG. 6A. The arrangement of FIG. 6A can be modified to provide so-called "cloverleaf" cell coverage by rotating antenna axes. Referring to the cell 602, antenna axes 616 can be obtained from the antenna axes 605 by a 30 degree rotation. As shown in FIG. 6A, the antenna axes 616 are configured to communicate with hexagonal sectors 618, 620, 622 that from a cloverleaf cell. In some examples, antenna axis rotation is combined with a cell size adjustment due to the size difference between sectors of hexagonal cells such as the cell 601 and hexagonal sectors such at the sector 622.

Figure 6B:
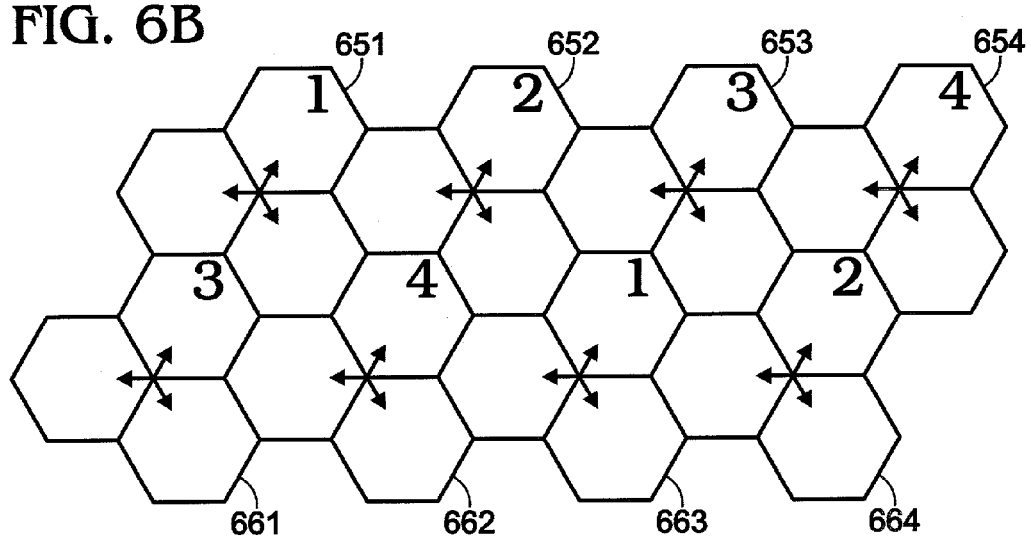

Frequencies can be assigned to the cloverleaf arrangement of FIG. 6A in various ways. In a representative example shown in FIG. 6B, cloverleaf cells 651, 652, 653, 654 are assigned frequency sets 1, 2, 3, 4, respectively and cloverleaf cells 661, 662, 663, 664 are assigned frequency sets 3, 4, 1, 2, respectively. FIG. 6C illustrates another representative example of frequency allocation.

According to representative examples, a wireless network coverage area is assigned a plurality of cell clusters. A cell cluster includes cells that are typically divided into cell sectors, cell segments, or other cell portions that are associated with portions of the coverage area. Each such sector or segment is assigned a unique channel frequency and a unique antenna axis direction. For convenience, antenna axes can be grouped into two or more sets that are rotated with respect to each other. In a specific example, a cell cluster includes twelve channel frequencies that are assigned to respective cell sectors. Six of the channel frequencies are assigned to each set of antenna axes. As situated in the coverage area, each channel frequency is associated with a single antenna axis direction. Antenna axes or sets thereof that are configured so that channel frequencies are assigned to a single antenna axis direction are referred to as unifrequency axes. In some configurations, antenna axes in certain cells or certain cell clusters are not rotated with respect to other antenna axes. For example, in reconfiguring an existing wireless network to reduce co-channel interference, antenna axes directions can be rotated in selected portions of the network coverage area to improve network performance.

It will be appreciated that the examples described above are illustrative and can be changed in arrangement and detail. We claim all that is encompassed by the appended claims.

We claim:

1. A wireless communication system, comprising:
 a first plurality of antenna sites situated in a coverage area and associated with a first set of antenna axes that are assigned channel frequencies from a first set of channel frequencies;
 a second plurality of antenna sites situated in the coverage area and associated with a second set of antenna axes that are assigned channel frequencies from a second set of channel frequencies, wherein the channel frequencies of the first set differ from the channel frequencies of the second set, and the second set of antenna axes is rotated with respect to the first set of antenna axes;
 a third plurality of antenna sites situated in the coverage area and associated with the first set of antenna axes and assigned channel frequencies from a third set of channel frequencies; and
 a fourth plurality of antenna sites situated in the coverage area, and associated with the second set of antenna axes and assigned channel frequencies from a fourth set of channel frequencies, wherein the channel frequencies of the first, second third and fourth sets are all different;
 wherein the antenna sites of the first plurality of antenna sites and the second plurality of antenna sites are alternating arranged in a first plurality of rows and antenna sites of the third plurality of antenna sites and the fourth plurality of antenna sites are alternatingly arranged in a second plurality of rows, and the rows of the first plurality and second plurality of rows are alternatingly arranged so as to substantially occupy the coverage area.

2. The wireless system of claim 1, wherein each of the sets of antenna axis directions includes three antenna axis directions angularly spaced by about 120 degrees.

3. The wireless system of claim 2, wherein the first set of antenna axis directions is rotated by about 60 degrees with respect to the second set of antenna axis directions.

4. The wireless system of claim 3, further comprising 90 degree directional antennas associated with the antenna axis directions.

5. The wireless system of claim 3, further comprising 60 degree directional antennas associated with the antenna axis directions.

6. The wireless system of claim 3, further comprising 120 degree directional antennas associated with the antenna axis directions.

* * * * *

UNITED STATES PATENT AND TRADEMARK OFFICE
CERTIFICATE OF CORRECTION

| | | |
|---|---|---|
| PATENT NO. | : 7,010,304 B1 | Page 1 of 1 |
| APPLICATION NO. | : 10/253403 | |
| DATED | : March 7, 2006 | |
| INVENTOR(S) | : Zhang et al. | |

It is certified that error appears in the above-identified patent and that said Letters Patent is hereby corrected as shown below:

In the Specification:

Column 8, line 24, "first, second third and fourth" should read -- first, second, third, and fourth --

Column 8, line 27, "are alternating arranged" should read -- are alternatingly arranged --

Signed and Sealed this

Sixth Day of March, 2007

JON W. DUDAS
*Director of the United States Patent and Trademark Office*